United States Patent
Lou et al.

(10) Patent No.: US 9,872,128 B2
(45) Date of Patent: Jan. 16, 2018

(54) METHOD OF ESTABLISHING STABLE PICONET AND SYSTEM OF ESTABLISHMENT OF STABLE PICONET BASED ON BLUETOOTH

(71) Applicant: HuiZhou TCL Mobile Communication Co., Ltd., HuiZhou (CN)

(72) Inventors: Xianghui Lou, HuiZhou (CN); Longjie Yu, HuiZhou (CN)

(73) Assignee: HuiZhou TCL Mobile Communication Co., Ltd., HuiZhou (CN)

( * ) Notice: Subject to any disclaimer, the term of this patent is extended or adjusted under 35 U.S.C. 154(b) by 36 days.

(21) Appl. No.: 15/100,790

(22) PCT Filed: Oct. 16, 2015

(86) PCT No.: PCT/CN2015/092113
§ 371 (c)(1),
(2) Date: Jun. 1, 2016

(87) PCT Pub. No.: WO2016/169231
PCT Pub. Date: Oct. 27, 2016

(65) Prior Publication Data
US 2017/0118582 A1    Apr. 27, 2017

(30) Foreign Application Priority Data
Apr. 23, 2015   (CN) .......................... 2015 1 0195906

(51) Int. Cl.
*H04W 84/20*     (2009.01)
*H04W 4/00*      (2009.01)
(Continued)

(52) U.S. Cl.
CPC ......... *H04W 4/008* (2013.01); *H04L 61/6022* (2013.01); *H04L 61/6081* (2013.01); *H04W 48/14* (2013.01); *H04W 84/18* (2013.01)

(58) Field of Classification Search
CPC ..... H04W 4/008; H04W 48/14; H04W 84/18; H04L 61/6022; H04L 61/6081
See application file for complete search history.

(56) References Cited

U.S. PATENT DOCUMENTS

| 2009/0232041 A1* | 9/2009 | Smith .................. H04L 1/1867 370/312 |
| 2011/0098001 A1* | 4/2011 | Elsom-cook ............. G01S 3/20 455/41.2 |
| 2014/0113557 A1* | 4/2014 | Jain ....................... H04W 48/04 455/41.2 |

FOREIGN PATENT DOCUMENTS

| CN | 101959328 | 1/2011 |
| CN | 104022805 | 9/2014 |

(Continued)

*Primary Examiner* — Lakeram Jangbahadur

(57) ABSTRACT

The present disclosure includes a method of establishing a stable Piconet based on Bluetooth. The method includes: serving a central device as a slave and serving peripheral devices as a master, establishing a Piconet, and recording the state of the peripheral devices linking to the central device; and performing automatic inquiry and identification matching; if an identification is matched, pulling in all of the peripheral devices, and establishing the stable Piconet in the central device. The central device can be connected without setting up any peripheral devices, which is quite convenient for the users.

12 Claims, 3 Drawing Sheets

(51) Int. Cl.
    *H04W 48/14*    (2009.01)
    *H04L 29/12*    (2006.01)
    *H04W 84/18*    (2009.01)

(56) References Cited

FOREIGN PATENT DOCUMENTS

| | | |
|---|---|---|
| CN | 104483841 | 4/2015 |
| CN | 104883656 | 9/2015 |
| WO | WO 2014/065903 | 5/2014 |

\* cited by examiner

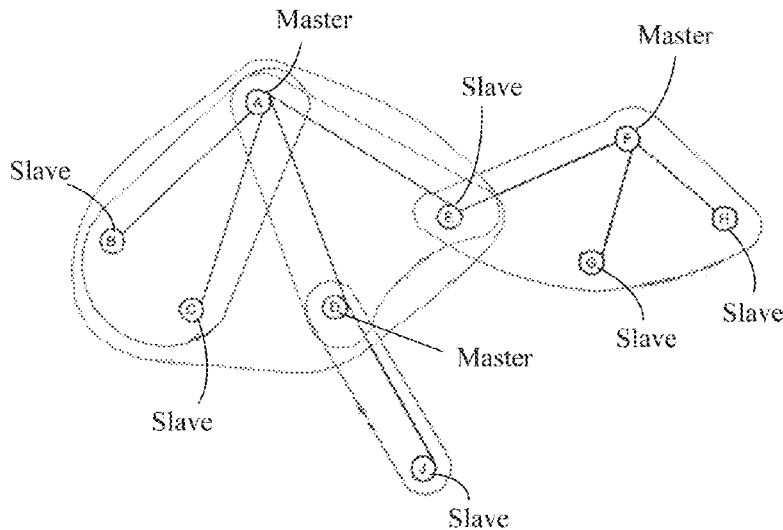

Fig. 1

Serving a central device as the slave and as a discoverable role, serving at most seven peripheral devices as a master for inquiry and linking the central device according to the Bluetooth logical link control and adaptation protocol (L2CAP), establishing a Piconet or a Scatternet, providing a Bluetooth address of the peripheral devices to the central device after successful connection, and recording the state of the peripheral devices linking to the central device ⸺ S100

Disconnecting all of the peripheral devices from the central device network, reentering the inquiry range of the central device, performing automatic inquiry and identification matching in the central device, requesting all of the peripheral devices to be linked according to the L2CAP if an identification is matched, pulling in all of the peripheral devices, and establishing a stable Piconet. ⸺ S200

Fig. 2

METHOD OF ESTABLISHING STABLE PICONET AND SYSTEM OF ESTABLISHMENT OF STABLE PICONET BASED ON BLUETOOTH

RELATED APPLICATIONS

This application is a National Phase of PCT Patent Application No. PCT/CN2015/092113 having International filing date of Oct. 16, 2015, which claims the benefit of priority of Chinese Patent Application No. 201510195906.8 filed on Apr. 23, 2015. The contents of the above applications are all incorporated by reference as if fully set forth herein in their entirety.

FIELD AND BACKGROUND OF THE INVENTION

The present invention relates to the field of Bluetooth technology, and more particularly, to a method of establishing a stable Piconet and a system of establishment of the stable Piconet based on Bluetooth.

The development of the communications technology improves the development of the Internet of Things (IoT) and industrialization. For example, a variety of devices in an intelligent home (such as audio video communication, lighting system, curtain control, air-conditioning control, security system, digital cinema system, audio/video service, video cabinet system, and network household appliances) are connected through networking technology. The convenient functions and means, such as household appliances control, lighting control, telephone remote control, indoor/outdoor remote control, burglar alarm, environmental monitoring, heating ventilating and air-conditioning (HVAC) control, infrared transmittance, and programmable timing control, are provided. Other functions and means, such as architecture, internetwork communication, information household appliances, and equipment automation, are also widely provided. These functions, means, and messages are omnibearing and interacting. Further, it is possible to save money from all sorts of energy costs. However, many of the devices need to be set up and connected when users try to use them in a normal condition. For the users of the devices, it may be quite a bother.

Therefore, the conventional technology needs further improvement and development.

SUMMARY OF THE INVENTION

With regard to the existing technological defects, a method of establishing a stable Piconet and a system of establishment of the stable Piconet based on Bluetooth are proposed. An object of the present invention is to overcome the problem of inconvenience to a user of a conventional intelligent device caused by setting configurations of multiple devices when wireless connection of the conventional intelligent device is enabled.

According to the present invention, a method of establishing a stable Piconet based on Bluetooth comprises steps of:

serving a central device as a slave and as a discoverable role, serving peripheral devices as a master for inquiry and linking to the central device, establishing a Piconet or a Scatternet, providing a Bluetooth address of the peripheral devices to the central device after successful connection, and recording the state of the peripheral devices linking to the central device;

performing automatic inquiry and identification matching, requesting all of the peripheral devices to be connected if an identification is matched, pulling in all of the peripheral devices, and establishing the stable Piconet in the central device when all of the peripheral devices are disconnected from central device network and reenter an inquiry range of the central device; and backing up the same tables about operational types and operational results locally in the central device and all of the peripheral devices after the stable Piconet is completely established, and the central device's controlling working activities of the peripheral devices.

Preferably, steps of the central device's controlling the working activities of the peripheral devices comprise:

using a mobile terminal to send a customized control/request message to the peripheral devices through the central device at Internet network remote control to further control the peripheral devices;

analyzing a Bluetooth (BT) Address in the message and matching a local Bluetooth Address after receiving the message sent by the central device, perform corresponding operations if the BT Address matches the local Bluetooth Address successfully, and do not perform any operations if the BT Address does not match the local Bluetooth Address.

Preferably, the step of serving the central device as the slave and as the discoverable role, serving the peripheral device as the master for inquiry and linking to the central device, establishing the Piconet or the Scatternet, providing the Bluetooth address of the peripheral device to the central device after the successful connection, and recording the state of the peripheral device linking to the central device comprises:

serving the central device as the slave and as the discoverable role, serving a first peripheral device as a master for inquiry and linking the central device according to the Bluetooth logical link control and adaptation protocol (L2CAP), establishing a Piconet with a single slave, providing a Bluetooth address of the first peripheral device to the central device after the successful connection, and recording the state of the first peripheral device actively linking the central device;

serving the central device as the slave and as the discoverable role, serving a second peripheral device as a master for inquiry and linking the central device according to the L2CAP, establishing the Scatternet, providing a Bluetooth address of the second peripheral device to the central device after the successful connection, and recording the state of the second peripheral device actively linking the central device;

disconnecting the first peripheral device and the second peripheral device from the central device network, reentering the inquiry range of the central device, performing automatic inquiry and identification matching in the central device, requesting the first peripheral device and the second peripheral device to be linked according to the L2CAP if an identification is matched, pulling in the first peripheral device and the second peripheral device, and establishing a stable Piconet with dual slaves;

serving the central device as the slave and as the discoverable role, serving one or more than one of a third peripheral device, a fourth peripheral device, a fifth peripheral device, a sixth peripheral device, and a seventh peripheral device as a master (or masters) for inquiry and linking the central device according to the L2CAP, and establishing the Scatternet.

Preferably, the step of disconnecting all of the peripheral devices from the central device network, reentering the_ inquiry range of the central device, and performing automatic inquiry and identification matching in the central device further comprises:

sending a first message and data package in a Payload format to the peripheral devices, the first message and data package comprising a field of a byte length of the message, a field of a Bluetooth object receiving the message, a field of an operational type of the message, and a field of a delayed duration of the message.

Preferably, when the central device performs automatic inquiry and identification matching and sends the message and data package in the Payload format to the peripheral devices, the peripheral devices analyze the field of the Bluetooth object receiving the message in the message and data package. If the two match, the peripheral devices send a second message and data package in the Payload format to the central device, wherein the second message and data package comprises a field of a byte length of the message, a field of a Bluetooth address of the peripheral devices, and a field of an operational result.

According to the present invention, a method of establishing a stable Piconet based on Bluetooth comprises steps of:

serving a central device as a slave and as a discoverable role, serving at most seven peripheral devices as a master for inquiry and linking to the central device by using a logical link control and adaptation protocol (L2CAP), establishing a Piconet or a Scatternet, providing a Bluetooth address of the peripheral devices to the central device after successful connection, and recording the state of the peripheral devices linking to the central device;

performing automatic inquiry and identification matching, requesting all of the peripheral devices to be connected if an identification is matched, pulling in all of the peripheral devices, and establishing the stable Piconet in the central device when all of the peripheral devices are disconnected from central device network and reenter an inquiry range of the central device;

backing up the same tables about operational types and operational results locally in the central device and all of the peripheral devices after the stable Piconet is completely established, and the central device's controlling working activities of the peripheral devices.

Preferably, the step of serving a central device as a slave and as a discoverable role, serving at most seven peripheral devices as a master for inquiry and linking to the central device according to an logical link control and adaptation protocol (L2CAP), establishing a Piconet or a Scatternet, providing a Bluetooth address of the peripheral devices to the central device after successful connection, and recording the state of the peripheral devices linking to the central device comprises:

serving the central device as the slave and as the discoverable role, serving a first peripheral device as a master for inquiry and linking the central device according to the Bluetooth logical link control and adaptation protocol (L2CAP), establishing a Piconet with a single slave, providing a Bluetooth address of the first peripheral device to the central device after the successful connection, and recording the state of the first peripheral device actively linking the central device;

serving the central device as the slave and as the discoverable role, serving a second peripheral device as a master for inquiry and linking the central device according to the L2CAP, establishing the Scatternet, providing a Bluetooth address of the second peripheral device to the central device after the successful connection, and recording the state of the second peripheral device actively linking the central device;

disconnecting the first peripheral device and the second peripheral device from the central device network, reentering the inquiry range of the central device, performing automatic inquiry and identification matching in the central device, requesting the first peripheral device and the second peripheral device to be linked according to the L2CAP if an identification is matched, pulling in the first peripheral device and the second peripheral device, and establishing a stable Piconet with dual slaves;

serving the central device as the slave and as the discoverable role, serving one or more than one of a third peripheral device, a fourth peripheral device, a fifth peripheral device, a sixth peripheral device, and a seventh peripheral device as masters for inquiry and linking the central device according to the L2CAP, and establishing the Scatternet.

Preferably, after the step of establishing the stable Piconet in the central device when all of the peripheral devices are disconnected from central device network and reenter an inquiry range of the central device, the method further comprises:

backing up the same tables about operational types and operational results locally in the central device and all of the peripheral devices after the stable Piconet is completely established.

Preferably, the step of disconnecting all of the peripheral devices from the central device network, reentering the inquiry range of the central device, and performing automatic inquiry and identification matching in the central device further comprises:

sending a first message and data package in a Payload format to the peripheral devices, the first message and data package comprising a field of a byte length of the message, a field of a Bluetooth object receiving the message, a field of an operational type of the message, and a field of a delayed duration of the message.

Preferably, when the central device performs automatic inquiry and identification matching and sends the message and data package in the Payload format to the peripheral devices, the peripheral devices analyze the field of the Bluetooth object receiving the message in the message and data package. If the two match, the peripheral devices send a second message and data package in the Payload format to the central device, wherein the second message and data package comprises a field of a byte length of the message, a field of a Bluetooth address of the peripheral devices, and a field of an operational result.

According to the present invention, a system of establishing a stable Piconet based on Bluetooth comprises:

a link recording module, for serving a central device as a slave and as a discoverable role, serving at most seven peripheral devices as a master for inquiry and linking the central device according to the Bluetooth logical link control and adaptation protocol (L2CAP), establishing a Piconet or a Scatternet, providing a Bluetooth address of the peripheral devices to the central device after successful connection, and recording the state of the peripheral devices linking to the central device;

a networking module, for disconnecting all of the peripheral devices from central device network, reentering the inquiry range of the central device, performing automatic inquiry and identification matching in the central device, requesting all of the peripheral devices to be linked according to the L2CAP if an identification is matched, pulling in all of the peripheral devices, and establishing the stable Piconet.

Preferably, the link recording module comprises:

a first recording unit, for serving the central device as the slave and as the discoverable role, serving a first peripheral device as a master for inquiry and linking the central device according to the L2CAP, establishing a Piconet with a single slave, providing a Bluetooth address of the first peripheral device to the central device after the successful connection, and recording the state of the first peripheral device actively linking the central device;

a second recording unit, for serving the central device as the slave and as the discoverable role, serving a second peripheral device as a master for inquiry and linking the central device according to the L2CAP, establishing the Scatternet, providing a Bluetooth address of the second peripheral device to the central device after the successful connection, and recording the state of the second peripheral device actively linking the central device;

a first Piconet networking unit, for disconnecting the first peripheral device and the second peripheral device from the central device network, reentering the inquiry range of the central device, performing automatic inquiry and identification matching in the central device, requesting the first peripheral device and the second peripheral device to be linked according to the L2CAP if an identification is matched, pulling in the first peripheral device and the second peripheral device, and establishing a stable Piconet with dual slaves;

a Scatternet networking unit, for serving the central device as the slave and as the discoverable role, serving one or more than one of a third peripheral device, a fourth peripheral device, a fifth peripheral device, a sixth peripheral device, and a seventh peripheral device as masters for inquiry and linking the central device according to the L2CAP, and establishing the Scatternet.

Preferably, the system further comprises:

a backup module, for backing up the same tables about operational types and operational results locally in the central device and all of the peripheral devices after the stable Piconet is completely established.

Preferably, the networking module is further used in a condition that the central device sends a first message and data package in the Payload format to the peripheral devices when all of the peripheral devices are disconnected from the central device network and reenter the inquiry range of the central device and the central device performs automatic inquiry and identification matching, and the first message and data package comprises a field of a byte length of the message, a field of a Bluetooth object receiving the message, a field of an operational type of the message, and a field of a delayed duration of the message.

Preferably, the peripheral devices analyze the field of the Bluetooth object receiving the message in the message and data package when the central device performs automatic inquiry and identification matching and sends the message and data package in the Payload format to the peripheral devices, the peripheral devices send a second message and data package in the Payload format to the central device if the two match, and the second message and data package comprises a field of a byte length of the message, a field of a Bluetooth address of the peripheral devices, and a field of an operational result.

The present invention proposes a method of establishing a stable Piconet and a system of establishment of the stable Piconet based on Bluetooth. The method comprises a central device serving as a slave and as a discoverable role, at most seven peripheral devices as a master for inquiring and linking the central device according to the Bluetooth logical link control and adaptation protocol (L2CAP), establishing a Piconet or a Scatternet, providing a Bluetooth address of the peripheral devices to the central device after successful connection, and recording the state of the peripheral devices linking to the central device. When all of the peripheral devices are disconnected from the central device network and reenter the inquiry range of the central device, the central device performs automatic inquiry and identification matching, requests all of the peripheral devices to be linked according to the L2CAP if an identification is matched, pulls in all of the peripheral devices, and establishes a stable Piconet. The central device can be connected without setting up any peripheral devices; instead, the central device controls the peripheral devices to perform functions, which is quite convenient for the users.

BRIEF DESCRIPTION OF THE SEVERAL VIEWS OF THE DRAWINGS

FIG. 1 shows a network topology of Bluetooth devices according to a preferred embodiment of the present invention.

FIG. 2 shows a flowchart of the method of establishing the stable Piconet based on Bluetooth according to one preferred embodiment of the present invention.

DESCRIPTION OF SPECIFIC EMBODIMENTS OF THE INVENTION

Figure 3:
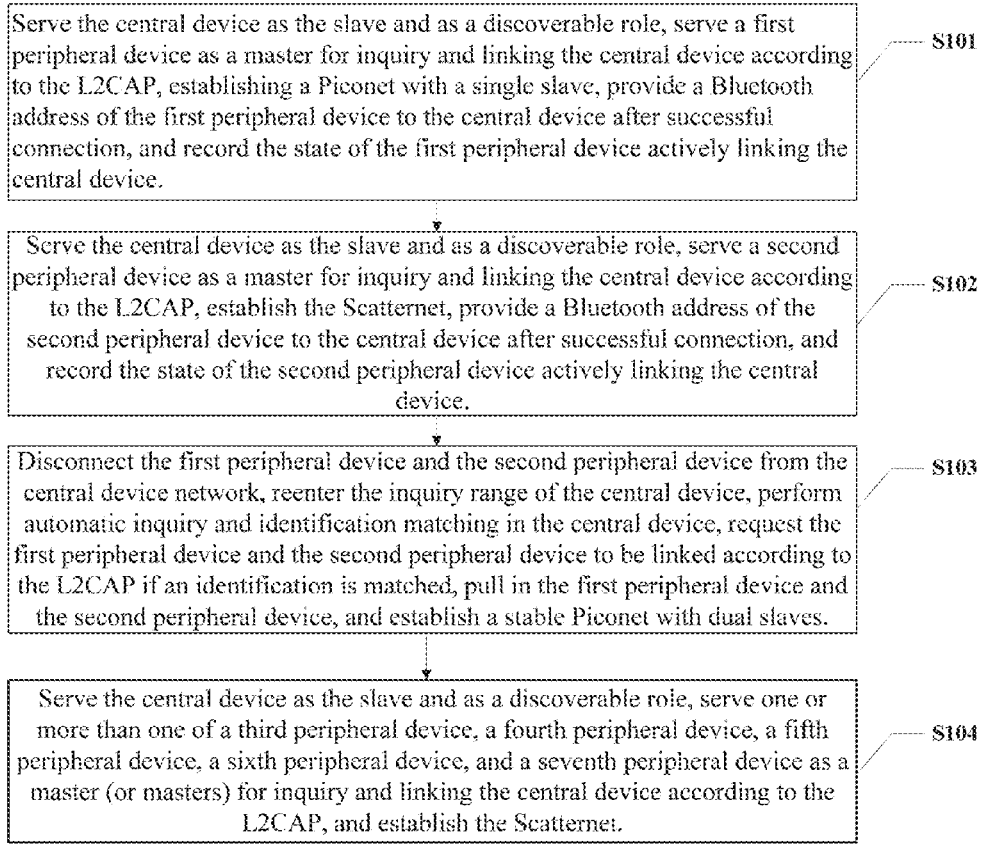
FIG. 3 shows is a flowchart of the step of recording the state of Bluetooth link according to one preferred embodiment of the present invention.

For the purpose of description rather than limitation, the following provides such specific details as a specific system structure, interface, and technology for a thorough understanding of the application. However, it is understandable by persons skilled in the art that the application can also be implemented in other embodiments not providing such specific details. In other cases, details of a well-known apparatus, circuit and method are omitted to avoid hindering the description of the application by unnecessary details.

At first, a conventional Bluetooth Protocol is detailed as follows.

The conventional Bluetooth has merits of larger transmittance data and a faster data transfer rate so the conventional Bluetooth is good for diverse applications. The development of the conventional Bluetooth Protocol focuses on the Bluetooth logical link control and adaptation protocol (L2CAP), the Generic Access Profile (GAP), and an application profile. The full detail of the L2CAP, the GAP, and the application profile will be related.

1) Logical Link Control and Adaptation Protocol (L2CAP)

According to the conventional Bluetooth protocol announced by the Bluetooth Special Interest Group (Bluetooth SIG), the command format and the data format are defined by the L2CAP.

A series of alternative commands are required for two Bluetooth devices in the communication process. The Common Channel Signaling (CCS) format of a command channel is as shown in Table 1.

TABLE 1

| | | Commands | | | |
|---|---|---|---|---|---|
| Length | Channel ID | Code | Identifier | Length | Data |
| m + 4<br>2 Bytes | 0001<br>2 Bytes | 1 Byte | 1 Byte | m<br>2 Bytes | m Bytes |

Length represents the byte length of the Commands. The Channel ID is set as 0x0001. The Code in the Commands represents the type of a command, such as the Connection Request, and the Connection Response, as shown in Table 2. Identifier in Commands is used for matching request and response. Length in Commands represents the byte length of the Data in the Commands. The Data in the Commands represents messages carried by a command.

TABLE 2

| Code | Description |
|---|---|
| 0x00 | RESERVED |
| 0x01 | Command reject |
| 0x02 | Connection request |
| 0x03 | Connection response |
| 0x04 | Configure request |
| 0x05 | Configure response |
| 0x06 | Disconnection request |
| 0x07 | Disconnection response |
| 0x08 | Echo request |
| 0x09 | Echo response |
| 0x0A | Information request |
| 0x0B | Information response |

The Commands format of Connection Request is shown in Table 3. PSM represents protocol/service multiplexing. The PSM has two parts. The first part is assigned by the Bluetooth SIG to be always as a protocol. The second part is assigned by system dynamics to be for service. PSM has at least two bytes. The Source CID (short for source channel identification) represents a channel identification of the Bluetooth device which sends the Connection Request.

TABLE 3

| | | | Data | |
|---|---|---|---|---|
| Code | Identifier | Length | PSM | Source CID |
| 02<br>1 Byte | 1 Byte | m + 2<br>2 Bytes | m(≥2) Bytes | 2 Bytes |

The commands format of the connection response is shown in Table 4.

TABLE 4

| | | | Data | | | |
|---|---|---|---|---|---|---|
| Code | Identifier | Length | Destination CID | Source CID | Result | Status |
| 03<br>1 Byte | 1 Byte | 8<br>2 Bytes | 2 Bytes | 2 Bytes | 2 Bytes | 2 Bytes |

Destination CID (short for destination channel identification) represents a channel identification of a Bluetooth device which sends a connection request. The Source CID represents the channel ID of the Bluetooth device which receives the Connection Response. The channel ID of the Bluetooth device directly copies the Source CID with the Connection Request. Result represents the result of the Connection Request, such as the Connection Successful, the Connection Pending, and the Connection Refused, as shown in Table 5.

TABLE 5

| Value | Description |
|---|---|
| 0x0000 | Connection successful |
| 0x0001 | Connection pending |
| 0x0002 | Connection refused - PSM not supported |
| 0x0003 | Connection refused - security block |
| 0x0004 | Connection refused - no resources available |
| Other | Reserved |

Status is used for further explaining why the result of the Connection Request is Connection Pending, as shown in Table 6.

TABLE 6

| Value | Description |
|---|---|
| 0x0000 | No further information available |
| 0x0001 | Authentication pending |
| 0x0002 | Authorization pending |
| Other | Reserved |

After the two Bluetooth devices are connected point to point, the data-format package is shown in Table 7. Length represents the byte length of the Information Payload. The Channel ID is assigned by system dynamics. The Information Payload represents the data-content package. The length of the Information Payload ranges from zero to 65535 bytes.

TABLE 7

| Length | Channel ID | Information payload |
|---|---|---|
| m<br>2 Bytes | 2 Bytes | m Bytes |

When three or more than three Bluetooth devices are successively connected and form the Piconet, the data-format package sent by the master is shown in Table 8. Length represents the total byte length of PSM and Information Payload. The Channel ID is constantly set as 0x0002. PSM represents protocol/service multiplexing. The PSM has two parts. The first part is assigned by the Bluetooth SIG to be always as a protocol. The second part is assigned by system dynamics to be for service. PSM has at least two bytes. The Information Payload represents the data-content package. The length of the Information Payload ranges from zero to 65533 bytes. The data-content package sent by the slave in the Piconet is shown in Table 7.

TABLE 8

| Length | Channel ID | PSM | Information payload |
|---|---|---|---|
| m + n<br>2 Bytes | 0002<br>2 Bytes | m(≥2) Bytes | n Bytes |

The GAP defines some states and processes such as inquiry, discoverability, connection, connectability, and connection on the way.

The Bluetooth device inquires surrounding Bluetooth devices and is discovered by the surrounding Bluetooth devices at the same time by means of time division multiplexing (TDM). That is, the conventional Bluetooth device can be used as an inquiring device and a discoverable device at the same time. The inquiring device obtains a Bluetooth address of the discoverable device by means of inquiry.

The inquiring device and the discoverable device may have been connected to another Bluetooth device but still have functions of inquiry and discoverability.

The Bluetooth device is connected to surrounding Bluetooth devices, and the surrounding Bluetooth devices are connected to the Bluetooth device at the same time. That is, the Bluetooth device can be used as a linking device and a connectable device at the same time. The linking device sends the Connection Request to the connectable device, and the connectable device sends the Connection Response to the linking device. After the connection is successful, the Bluetooth device which initiates connection becomes master in the network, and the connected Bluetooth device becomes slave in the network.

The linking device and the connectable device may have been connected to another Bluetooth device but still have functions of connection and connectability.

After the two Bluetooth devices are successfully connected, string messages can be sent back and forth by the two Bluetooth devices. The two connected Bluetooth devices still have the functions of inquiry, discoverability, connection, and connectability.

A plurality of Bluetooth devices form a network. The network topology is shown in FIG. 1. Three Piconets are shown in FIG. 1. A is the master, and B, C, D, and E are the Piconet as the slave; F is the master, and E, G, and H are the Piconet as the slave; D is the master, and J is the Piconet as the slave. The Piconet comprises a master and one to seven slaves. The master sends string messages to all of the slaves simultaneously. All of the slaves send string messages to the master independently.

The Bluetooth devices intersect between Piconet A and Piconet F and between Piconet A and Piconet D. Therefore, Piconet A and Piconet F, Piconet A and Piconet D, and three Piconets form Scatternet. For example, E sends string messages to A and F at the same time in the Scatternet formed by Piconet A and Piconet F; D sends string messages to A and J at the same time in the Scatternet formed by Piconet A and Piconet D.

The present invention mixes the merits of conventional Bluetooth and proposes a method of establishing a stable Piconet based on Bluetooth. Please refer to FIG. 2 showing a flowchart of the method of establishing the stable Piconet based on Bluetooth according to one preferred embodiment of the present invention. The method of establishing the stable Piconet based on Bluetooth comprises following steps of:

Step S100: Serving a central device as the slave and as a discoverable role, serving at most seven peripheral devices as a master for inquiry and linking the central device according to the Bluetooth logical link control and adaptation protocol (L2CAP), establishing a Piconet or a Scatternet, providing a Bluetooth address of the peripheral devices to the central device after successful connection, and recording the state of the peripheral devices linking to the central device;

Step S200: Disconnecting all of the peripheral devices from the central device network, reentering the inquiry range of the central device, performing automatic inquiry and identification matching in the central device, requesting all of the peripheral devices to be linked according to the L2CAP if an identification is matched, pulling in all of the peripheral devices, and establishing a stable Piconet.

Step S100 comprises detailed steps as FIG. 3 shows.

Step S101: Serving the central device as the slave and as a discoverable role, serving a first peripheral device as a master for inquiry and linking the central device according to the L2CAP, establishing a Piconet with a single slave, providing a Bluetooth address of the first peripheral device to the central device after successful connection, and recording the state of the first peripheral device actively linking the central device;

Step S102: Serving the central device as the slave and as a discoverable role, serving a second peripheral device as a master for inquiry and linking the central device according to the L2CAP, establishing the Scatternet, providing a Bluetooth address of the second peripheral device to the central device after successful connection, and recording the state of the second peripheral device actively linking the central device;

Step S103: Disconnecting the first peripheral device and the second peripheral device from the central device network, reentering the inquiry range of the central device, performing automatic inquiry and identification matching in the central device, requesting the first peripheral device and the second peripheral device to be linked according to the L2CAP if an identification is matched, pulling in the first peripheral device and the second peripheral device, and establishing a stable Piconet with dual slaves;

Step S104: Serving the central device as the slave and as a discoverable role, serving one or more than one of a third peripheral device, a fourth peripheral device, a fifth peripheral device, a sixth peripheral device, and a seventh peripheral device as a master (or masters) for inquiry and linking the central device according to the L2CAP, and establishing the Scatternet.

After the networking completes, the central device obtains the Bluetooth addresses of the peripheral devices and the identifications indicating to the peripheral devices actively connected. The central device keeps do the act of inquiry. When the peripheral devices are disconnected from the network and reenters the inquiry range of the central device, the central device automatically inquires. Also, the central device links the peripheral devices to the L2CAP and pulls the peripheral devices into the network just as a wireless fidelity (Wi-Fi) device is automatically connected to the Wi-Fi network which has been connected previously.

The central device is capable of automatically inquiring and linking itself to peripheral devices such as air-conditioning devices, water heaters, and washing machines in an intelligent home. The mobile machine is capable of controlling the intelligent home through the central device at Internet network remote control. The stable Piconet networking can be applied at some scenes such as recovery from service interruption. The central device is capable of automatically inquiring, matching identifications, and linking the devices and fixtures at the intelligent home to the L2CAP of the BT without any manual connections. When the peripheral devices are disconnected from the central device and reenter the inquiry range of the central device after having been connected to the central device, the central device automatically inquires and matches the connected identification. If the two match, the central device links the peripheral devices to the L2CAP.

After the stable Piconet network is established, the central device controls working activities of the peripheral devices such as to turn on instantly, to turn off instantly, to postpone to turn on, and to postpone to turn off. Therefore, the same tables about operational types and operational results are backed up locally in the central device and all of the peripheral devices for encoding and decoding correctly, as Table 9 shows.

TABLE 9

| Operation Code | Description |
| --- | --- |
| 0000 | Central asks peripheral to open immediately |
| 0001 | Central asks peripheral to close immediately |
| 0010 | Central asks peripheral to open after a delayed time |
| 0011 | Central asks peripheral to close after a delayed time |
| 0100 | Pheriphral opens successfully |
| 0101 | Pheriphral opens unsuccessfully |
| 0110 | Pheriphral closes successfully |
| 0111 | Pheriphral closes unsuccessfully |
| Other | Reserved |

Figure 5:
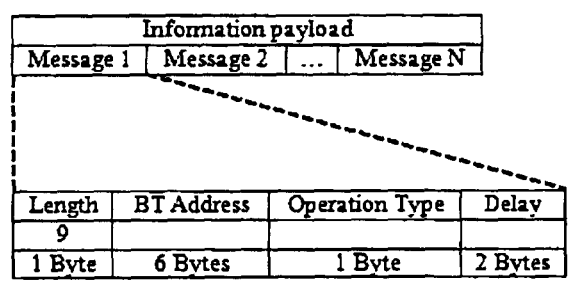
FIG. 5 illustrates a first message and data package according to the information payload.

The peripheral device customizes the Information Payload as the first message and data package as FIG. 5 shows based on Table 8. The first message and data package comprises a field of the byte length of the message, a field of a Bluetooth object receiving the message, a field of an operational type of the message, and a field of the delayed duration of the message. Message represents a message sent by the central device to all of the peripheral devices. Length in the Message represents the byte length of the Message while the length does not comprise the byte length of length itself. BT Address represents a Bluetooth object receiving the message. Operation Type represents an operational type, as Table 9 shows. Delay represents minutes of the delay. If the operational band has the function of time delay, the two-byte length represents minutes of twenty-four hours.

The peripheral device analyzes the BT Address in the message and matching a local Bluetooth Address after receiving the message sent by the central device. If the BT Address matches the local Bluetooth Address successfully, perform corresponding operations. If the BT Address does not match the local Bluetooth Address, do not perform any operations.

When the two match, the peripheral device sends an operational result to the central device. The peripheral device customizes the Information Payload as the second message and data package as Table 10 shows based on Table 7. The second message and data package comprises a field of the byte length of the message, a field of a Bluetooth address of the peripheral device, and a field of an operational result. Length represents the byte length of the message while the length does not comprise the byte length of length itself. BT Address represents the Bluetooth address of the peripheral device. Operation Result represents an operational result, as Table 9 shows.

TABLE 10

| Information payload | | |
| --- | --- | --- |
| Length | BT Address | Operation Result |
| 7 1 Byte | 6 Bytes | 1 Byte |

The method of establishing the stable Piconet based on Bluetooth according to one preferred embodiment of the present invention belongs to wireless communication based on the conventional Bluetooth. The central device automatically inquires, matches, and is connected to the peripheral devices. In the networking process, the peripheral devices only need to be connected to the central device once. The central device automatically inquires after the peripheral devices enter the inquiry range of the central device. Also, the peripheral devices are connected to the L2CAP according to the identifications just as the Wi-Fi device is automatically connected to the Wi-Fi network which has been connected previously. After the networking is complete, the user uses a mobile terminal to send a customized control/request message to the peripheral devices through the central device at Internet network remote control to further control the peripheral devices, which forms the intelligent network.

Figure 4:
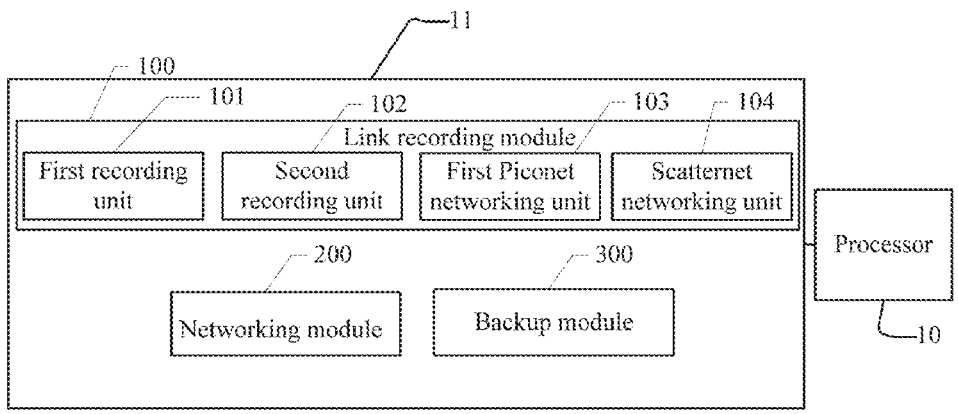
FIG. 4 shows a system of establishing the stable Piconet based on Bluetooth according to one preferred embodiment of the present invention.

The present invention further proposes a system of establishing a stable Piconet based on Bluetooth. Please refer to FIG. 4. The system of establishing the stable Piconet based on Bluetooth comprises a memory 11 and a processor 10. The memory 11 is used for storing instructions. The processor 10 is coupled to the memory 11, and is used to execute the instructions stored inside the memory 11. All of the modules 100, 200, and 300 and units 101, 102, 103, and 104 as introduced below, are instructions executable by the processor 10 to perform corresponding functions. The system comprises following components.

A link recording module 100, for serving a central device as the slave and as a discoverable role, serving at most seven peripheral devices as a master for inquiry and linking the central device according to the Bluetooth logical link control and adaptation protocol (L2CAP), establishing a Piconet or a Scatternet, providing a Bluetooth address of the peripheral devices to the central device after successful connection, and recording the state of the peripheral devices linking to the central device.

A networking module 200, for disconnecting all of the peripheral devices from the central device network, reentering the inquiry range of the central device, performing automatic inquiry and identification matching in the central device, requesting all of the peripheral devices to be linked according to the L2CAP if an identification is matched, pulling in all of the peripheral devices, and establishing a stable Piconet.

In the system of establishment of the stable Piconet based on Bluetooth, the link recording module 100 comprises following components.

A first recording unit 101, for serving the central device as the slave and as a discoverable role, serving a first peripheral device as a master for inquiry and linking the central device according to the L2CAP, establishing a Piconet with a single slave, providing a Bluetooth address of the first peripheral device to the central device after successful connection, and recording the state of the first peripheral device actively linking the central device.

A second recording unit 102, for serving the central device as the slave and as a discoverable role, serving a second peripheral device as a master for inquiry and linking the central device according to the L2CAP, establishing the Scatternet, providing a Bluetooth address of the second peripheral device to the central device after successful connection, and recording the state of the second peripheral device actively linking the central device.

A first Piconet networking unit 103, for disconnecting the first peripheral device and the second peripheral device from the central device network, reentering the inquiry range of the central device, performing automatic inquiry and identification matching in the central device, requesting the first peripheral device and the second peripheral device to be linked according to the L2CAP if an identification is matched, pulling in the first peripheral device and the second peripheral device, and establishing a stable Piconet with dual slaves.

A Scatternet networking unit 104, for serving the central device as the slave and as a discoverable role, serving one or more than one of a third peripheral device, a fourth peripheral device, a fifth peripheral device, a sixth peripheral device, and a seventh peripheral device as a master (or masters) for inquiry and linking the central device according to the L2CAP, and establishing the Scatternet.

The system of establishing the stable Piconet based on Bluetooth further comprises a following component.

A backup module 300, for backing up the same tables about operational types and operational results locally in the central device and all of the peripheral devices after the stable Piconet is completely established.

Based on the system of establishment of the stable Piconet based on Bluetooth, in the networking module 200, when all of the peripheral devices are disconnected from the central device network and reenter the inquiry range of the central device and the central device performs automatic inquiry and identification matching, the central device sends a first message and data package in the Payload format to the peripheral devices. The first message and data package comprises a field of the byte length of the message, a field of a Bluetooth object receiving the message, a field of an operational type of the message, and a field of the delayed duration of the message.

Based on the system of establishment of the stable Piconet based on Bluetooth, when the central device performs automatic inquiry and identification matching and sends a message and data package in the Payload format to the peripheral devices, the peripheral devices analyze the field of a Bluetooth object receiving the message in the message and data package. If the two match, the peripheral devices send a second message and data package in the Payload format to the central device. The second message and data package comprises a field of the byte length of the message, a field of a Bluetooth address of the peripheral devices, and a field of an operational result.

In sum, the present invention proposes a method of establishing a stable Piconet and a system of establishment of the stable Piconet based on Bluetooth. The method comprises a central device serving as a slave and as a discoverable role, at most seven peripheral devices as a master for inquiring and linking the central device according to the Bluetooth logical link control and adaptation protocol (L2CAP), establishing a Piconet or a Scatternet, providing a Bluetooth address of the peripheral devices to the central device after successful connection, and recording the state of the peripheral devices linking to the central device. When all of the peripheral devices are disconnected from the central device network and reenter the inquiry range of the central device, the central device performs automatic inquiry and identification matching, requests all of the peripheral devices to be linked according to the L2CAP if an identification is matched, pulls in all of the peripheral devices, and establishes a stable Piconet. The central device can be connected without setting up any peripheral devices; instead, the central device controls the peripheral devices to perform functions, which is quite convenient for the users.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. A method of establishing a stable Piconet based on Bluetooth, comprising steps of:
    serving a central device as a slave and as a discoverable role, serving a first peripheral device as a master for inquiry and linking the central device according to a Bluetooth logical link control and adaptation protocol (L2CAP), establishing a Piconet with a single slave, providing a Bluetooth address of the first peripheral device to the central device after the successful connection, and recording the state of the first peripheral device actively linking the central device;
    serving the central device as the slave and as the discoverable role, serving a second peripheral device as a master for inquiry and linking the central device according to the L2CAP, establishing a Scatternet, providing a Bluetooth address of the second peripheral device to the central device after the successful connection, and recording the state of the second peripheral device actively linking the central device;
    disconnecting the first peripheral device and the second peripheral device from the central device network, reentering the inquiry range of the central device, performing automatic inquiry and identification matching in the central device, requesting the first peripheral device and the second peripheral device to be linked according to the L2CAP if an identification is matched, pulling in the first peripheral device and the second peripheral device, and establishing a stable Piconet with dual slaves;
    serving the central device as the slave and as the discoverable role, serving one or more than one of a third peripheral device, a fourth peripheral device, a fifth peripheral device, a sixth peripheral device, and a seventh peripheral device as a master for inquiry and linking the central device according to the L2CAP, and establishing the Scatternet;
    performing automatic inquiry and identification matching, requesting all of the peripheral devices to be connected if an identification is matched, pulling in all of the peripheral devices, and establishing the stable Piconet in the central device when all of the peripheral devices are disconnected from central device network and reenter an inquiry range of the central device; and
    backing up tables about operational types and operational results locally in the central device and all of the peripheral devices after the stable Piconet is completely established, and the central device's controlling working activities of the peripheral devices.

2. The method of claim 1, wherein steps of the central device's controlling the working activities of the peripheral devices comprise:
    using a mobile terminal to send a customized control/request message to the peripheral devices through the central device at Internet network remote control to further control the peripheral devices;
    analyzing a Bluetooth (BT) Address in the message and matching a local Bluetooth Address after receiving the message sent by the central device, perform corresponding operations if the BT Address matches the local Bluetooth Address successfully, and do not perform any operations if the BT Address does not match the local Bluetooth Address.

3. The method of claim 1, wherein the step of disconnecting all of the peripheral devices from the central device network, reentering the inquiry range of the central device, and performing automatic inquiry and identification matching in the central device further comprises: sending a first message and data package in a Payload format to the peripheral devices, the first message and data package comprising a field of a byte length of the message, a field of a Bluetooth object receiving the message, a field of an operational type of the message, and a field of a delayed duration of the message.

4. The method of claim 3, wherein when the central device performs automatic inquiry and identification matching and sends the message and data package in the Payload format to the peripheral devices, the peripheral devices analyze the field of the Bluetooth object receiving the message in the message and data package; when the two match, the peripheral devices send a second message and data package in the Payload format to the central device, wherein the second message and data package comprises a field of a byte length of the message, a field of a Bluetooth address of the peripheral devices, and a field of an operational result.

5. A method of establishing a stable Piconet based on Bluetooth, comprising steps of:
   serving a central device as the slave and as a discoverable role, serving a first peripheral device as a master for inquiry and linking the central device according to a Bluetooth logical link control and adaptation protocol (L2CAP), establishing a Piconet with a single slave, providing a Bluetooth address of the first peripheral device to the central device after the successful connection, and recording the state of the first peripheral device actively linking the central device;
   serving the central device as the slave and as the discoverable role, serving a second peripheral device as a master for inquiry and linking the central device according to the L2CAP, establishing a Scatternet, providing a Bluetooth address of the second peripheral device to the central device after the successful connection, and recording the state of the second peripheral device actively linking the central device;
   disconnecting the first peripheral device and the second peripheral device from the central device network, reentering an inquiry range of the central device, performing automatic inquiry and identification matching in the central device, requesting the first peripheral device and the second peripheral device to be linked according to the L2CAP in an identification is matched, pulling in the first peripheral device and the second peripheral device, and establishing a stable Piconet with dual slaves;
   serving the central device as the slave and as the discoverable role, serving one or more than one of a third peripheral device, a fourth peripheral device, a fifth peripheral device, a sixth peripheral device, and a seventh peripheral device as masters for inquiry and linking the central device according to the L2CAP, and establishing the Scatternet;
   performing automatic inquiry and identification matching, requesting all of the peripheral devices to be connected if an identification is matched, pulling in all of the peripheral devices, and establishing the stable Piconet in the central device when all of the peripheral devices are disconnected from central device network and reenter the inquiry range of the central device; and
   backing up tables about operational types and operational results locally in the central device and all of the peripheral devices after the stable Piconet is completely established, and the central device's controlling working activities of the peripheral devices.

6. The method of claim 5, after the step of establishing the stable Piconet in the central device when all of the peripheral devices are disconnected from central device network and reenter an inquiry range of the central device, the method further comprising:
   backing up the same tables about operational types and operational results locally in the central device and all of the peripheral devices after the stable Piconet is completely established.

7. The method of claim 5, wherein the step of disconnecting all of the peripheral devices from the central device network, reentering the inquiry range of the central device, and performing automatic inquiry and identification matching in the central device further comprises: sending a first message and data package in a Payload format to the peripheral devices, the first message and data package comprising a field of a byte length of the message, a field of a Bluetooth object receiving the message, a field of an operational type of the message, and a field of a delayed duration of the message.

8. The method of claim 7, wherein when the central device performs automatic inquiry and identification matching and sends the message and data package in the Payload format to the peripheral devices, the peripheral devices analyze the field of the Bluetooth object receiving the message in the message and data package. If the two match, the peripheral devices send a second message and data package in the Payload format to the central device, wherein the second message and data package comprises a field of a byte length of the message, a field of a Bluetooth address of the peripheral devices, and a field of an operational result.

9. A system of establishing a stable Piconet based on Bluetooth, comprising:
   a processor;
   a memory connected with a processor, the memory comprising a plurality of program instructions executable by the processor,
   the system further comprises:
   a link recording module, configured to cause the processor to serve a central device as a slave and as a discoverable role, to serve at most seven peripheral devices as a master for inquiry and linking the central device according to the Bluetooth logical link control and adaptation protocol (L2CAP), to establish a Piconet or a Scatternet, providing a Bluetooth address of the peripheral devices to the central device after successful connection, and to record the state of the peripheral devices linking to the central device;
   a networking module, configured to cause the processor to disconnect all of the peripheral devices from central device network, to reenter an inquiry range of the central device, to perform automatic inquiry and identification matching in the central device, to request all of the peripheral devices to be linked according to the L2CAP if an identification is matched, to pull in all of the peripheral devices, and establishing the stable Piconet,
   wherein the link recording module comprises:
   a first recording unit, configured to cause the processor to serve the central device as the slave and as the discoverable role, to serve a first peripheral device as a master for inquiry and linking the central device according to the L2CAP, to establish a Piconet with a single slave, to provide a Bluetooth address of the first peripheral device to the central device after the successful connection, and to record the state of the first peripheral device actively linking the central device;

a second recording unit, configured to cause the processor to serve the central device as the slave and as the discoverable role, to serve a second peripheral device as a master for inquiry and linking the central device according to the L2CAP, to establish establishing the Scatternet, to provide a Bluetooth address of the second peripheral device to the central device after the successful connection, and to record the state of the second peripheral device actively linking the central device;

a first Piconet networking unit, configured to cause the processor to disconnect the first peripheral device and the second peripheral device from the central device network, to reenter the inquiry range of the central device, to perform automatic inquiry and identification matching in the central device, to request the first peripheral device and the second peripheral device to be linked according to the L2CAP if an identification is matched, to pull in the first peripheral device and the second peripheral device, and to establish a stable Piconet with dual slaves; and a Scatternet networking unit, configured to cause the processor to serve the central device as the slave and as the discoverable role, serving one or more than one of a third peripheral device, a fourth peripheral device, a fifth peripheral device, a sixth peripheral device, and a seventh peripheral device as masters for inquiry and linking the central device according to the L2CAP, and to establish the Scatternet.

10. The system of claim 9, wherein the system further comprises:

a backup module, configured to cause the processor to back up the same tables about operational types and operational results locally in the central device and all of the peripheral devices after the stable Piconet is completely established.

11. The system of claim 9, wherein the networking module is further used in a condition that the central device sends a first message and data package in the Payload format to the peripheral devices when all of the peripheral devices are disconnected from the central device network and reenter the inquiry range of the central device and the central device performs automatic inquiry and identification matching, and the first message and data package comprises a field of a byte length of the message, a field of a Bluetooth object receiving the message, a field of an operational type of the message, and a field of a delayed duration of the message.

12. The system of claim 11, wherein the peripheral devices analyze the field of the Bluetooth object receiving the message in the message and data package when the central device performs automatic inquiry and identification matching and sends the message and data package in the Payload format to the peripheral devices, the peripheral devices send a second message and data package in the Payload format to the central device if the two match, and the second message and data package comprises a field of a byte length of the message, a field of a Bluetooth address of the peripheral devices, and a field of an operational result.

* * * * *